United States Patent [19]

Oliver

[11] Patent Number: 4,845,409

[45] Date of Patent: Jul. 4, 1989

[54] INDEPENDENT TOP/BOTTOM RASTER CORRECTION

[75] Inventor: Kirk Oliver, Forest Park, Ill.

[73] Assignee: Zenith Electronics Corporation, Glenview, Ill.

[21] Appl. No.: 139,689

[22] Filed: Dec. 30, 1987

Related U.S. Application Data

[63] Continuation-in-part of Ser. No. 694, Jan. 6, 1987, Pat. No. 4,766,354.

[51] Int. Cl.⁴ .............................................. H01J 29/56
[52] U.S. Cl. ................................................... 315/371
[58] Field of Search ................................ 315/370, 371

[56] References Cited

U.S. PATENT DOCUMENTS

| | | | |
|---|---|---|---|
| 4,063,134 | 12/1977 | Iida | 315/371 |
| 4,395,662 | 7/1983 | Sexton, Jr. | 315/371 |
| 4,422,020 | 12/1983 | Lehnert et al. | 315/371 |
| 4,482,846 | 11/1984 | Worster | 315/371 |
| 4,496,882 | 1/1985 | Oliver et al. | 315/371 |
| 4,642,530 | 2/1987 | Rodriguez-Cavazos | 315/371 |
| 4,654,564 | 3/1987 | Lehnert | 315/371 |
| 4,682,085 | 7/1987 | Haferl et al. | 315/371 |
| 4,687,973 | 8/1987 | Holmes et al. | 315/371 |
| 4,733,140 | 3/1988 | Oliver | 315/371 |

Primary Examiner—Thomas H. Tarcza
Assistant Examiner—David Cain

[57] ABSTRACT

Top and bottom pincushion correction signals with separately controllable first and second order components are provided. A switching signal, developed from the vertical ramp, operates a plurality of switches for selectively applying the top and bottom correction signals to the carrier input of a multiplier. A trapezoidal correction signal is also applied to this multiplier input. The modulator input of the multiplier is supplied with the vertical ramp. A parallellogram correction pulse is combined with the output of the multiplier. The resultant, generally bow tie-shaped, raster correction signal is applied to the vertical deflection means.

13 Claims, 2 Drawing Sheets

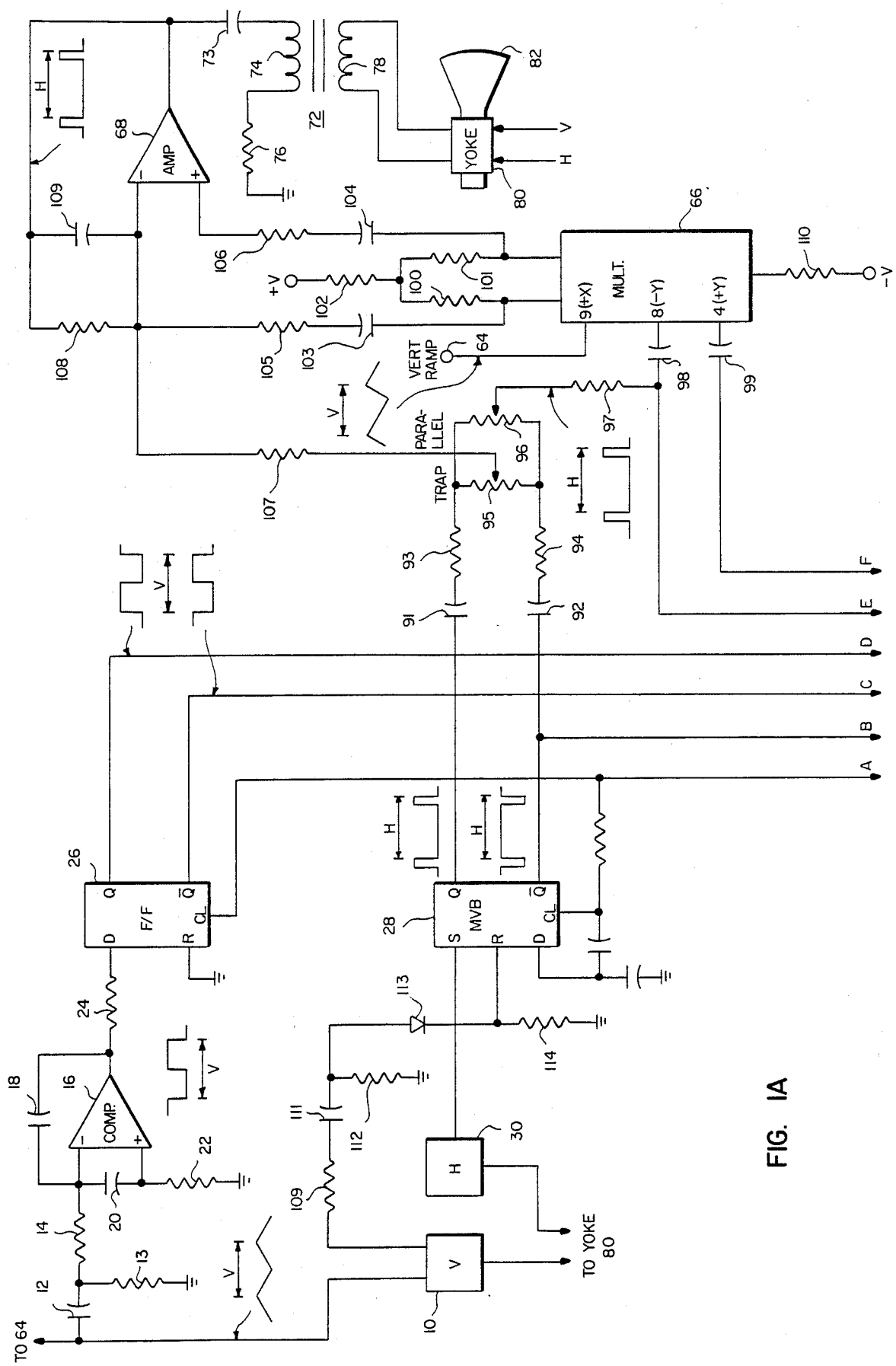
FIG. IA

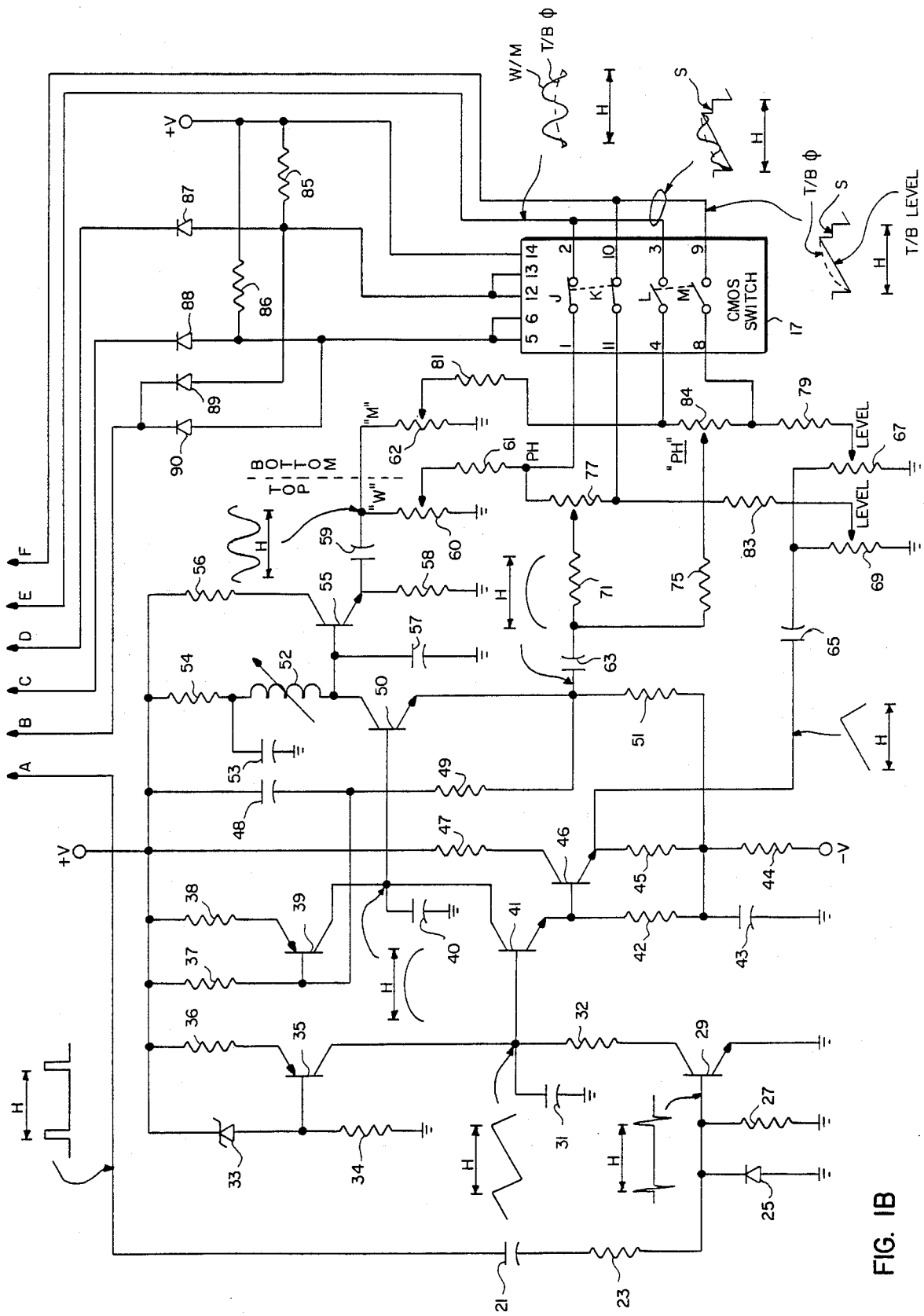
FIG. IB

INDEPENDENT TOP/BOTTOM RASTER CORRECTION

CROSS REFERENCE TO RELATED APPLICATIONS

This invention is a continuation-in-part of application Ser. No. 000,694, filed 1/6/87, now Pat. No. 4,766,354, issued Aug. 23, 198 entitled INDEPENDENT TOP/BOTTOM PINCUSHION CORRECTION, in the name of Kirk Oliver and assigned to Zenith Electronics Corporation. cl BACKGROUND OF THE INVENTION AND PRIOR ART As is well-known in the television art, the raster or deflection pattern produced on the spherical faceplate of a cathode ray tube (CRT) suffers pincushion distortion as the center of deflection of the electron beam deviates from the center of curvature of the screen. With non-spherically (flat) faced CRT's, the effect of pincushion distortion is more pronounced. Trapezoidal and other types of distortion are also introduced if the yoke, that is the horizontal and vertical deflection winding structure, is not accurately positioned on the neck of the CRT. Compounding the problem is the multi-gun shadow mask type of CRT which requires that the plural beams from the electron guns converge at the phosphor target to achieve color purity. The distortion correction circuits of the prior art add appropriate currents to the deflection yokes for straightening the top/bottom, and left/right sides of the scanned raster. As will be apparent to those skilled in the art, the deflection windings in the yoke may be configured to mechanically compensate for a portion of the pincushion errors. It is also common to incorporate a combination of mechanical correction in the yoke with electrical pincushion correction circuitry With the ever-increasing use of CRT's in monitor applications, where data is displayed rather than video or picture information, the constraints imposed upon the degree of pincushion, misconvergence and other forms of distortion have become much more rigid. In monitor applications, for example, it is imperative that the edges of the raster be closely controlled in size and linearity to assure a display field of correct dimensions and with straight edges.

The circuits of the prior art develop pincushion correction signals that generate yoke currents to produce a generally parabolic correction, with controllable phase, amplitude and tilt characteristics, for affecting both the top and the bottom of the raster in substantially the same way. These circuits have been generally satisfactory for use with less stringent television displays, but require excessive setup time (including careful yoke positioning adjustments) to meet the more exacting standards for CRT raster displays in monitors. Further, the problem is exacerbated with flat or substantially flat faced color tubes, such as the recently announced flat tension mask CRTs which have a flat faceplate and an in-line gun structure and wherein yoke construction and positioning may need to be somewhat compromised to enhance beam convergence throughout the raster.

U.S. Pat. No. 4,395,662, issued July 26, 1983, discloses a three tube projection color television system having independent top/bottom and side correction circuits and predeflection yokes. Separate top and bottom trapezoidal correction signals are also produced.

The above-mentioned application Ser. No. 000,694 discloses switching apparatus for enabling independent top and bottom controls to develop separate pincushion correction signals that are supplied to the vertical deflection system for correcting the top portion of the CRT raster and the bottom portion of the CRT raster. That system is capable of rapidly correcting pincushion distortion in a multigun flat-faced CRT to within a very small degree of error.

The present invention generally enables a manufacturer to correct for raster distortion, including pincushion distortion, to substantially that same degree of error despite rather significant mispositioning of the yoke on the neck of the CRT (which produces trapezoid distortion) and pincushion errors that may require widely different degrees of correction at the top and bottom of the raster. The invention in one aspect provides for the addition of a second order component of correction current, in addition to the first order correction component. The invention in another aspect includes a novel switching arrangement for applying independent raster correction signals to the top and bottom of the raster and also includes an arrangement that combines separate signals for the top and bottom portions of the raster within common signals that are applied to both portions of the raster.

OBJECTS OF THE INVENTION

A principal object of the invention is to provide a novel top/bottom raster correction circuit.

Another object of the invention is to provide novel apparatus for correcting a raster for top/bottom pincushion distortion, and trapezoidal and parallellogram distortion.

A further object of the invention is to provide an improved top/bottom raster correction circuit that enables rapid and accurate raster correction on a substantially flat-faced CRT.

BRIEF DESCRIPTION OF THE DRAWING

These and other objects and advantages of the invention will be apparent upon reading the following description in conjunction with the drawing in which FIGS. 1A and 1B together form a combined block and schematic diagram of the pincushion correction circuit of the invention.

DESCRIPTION OF THE PREFERRED EMBODIMENT

The following description of the invention and its various aspects may best be understood by positioning FIG. 1A above FIG. 1B with the arrows labelled A–F in each of the figures in respective alignment. The various waveforms indicated on the circuit diagram are to assist in understanding the invention.

In FIG. 1A, a source of vertical deflection signal 10 and a source of horizontal deflection signal 30 are illustrated in block form. A vertical ramp signal output from vertical deflection signal source 10 is coupled through a capacitor 12 and a resistor 14 to the negative input of a comparator 16. A resistor 13 connects the junction of capacitor 12 and resistor 14 to ground. A capacitor 20 interconnects the negative and positive inputs of comparator 16, and its positive input is returned to ground through a resistor 22. A feedback capacitor 18 connects the output of comparator 16 to its negative input. The output of comparator 16, which consists of a square wave having a period equal to the period of the vertical ramp signal, is connected through a resistor 24 to the data input (D) terminal of a flip-flop 26. The R terminal of flip-flop 26 is connected to ground. Flip-flop 26 has its Q and $\overline{Q}$ outputs coupled for controlling a bilateral CMOS switch 17 (FIG. 1B), having a plurality of single pole switches labelled J, K, L and M, respectively, contained in a convenient integrated circuit package that is commercially available under the designation MC14066. Switches J and K are operated together in response to an appropriate signal at the $\overline{Q}$ output of flip-flop 26 and switches L and M are operated together in response to an appropriate signal at the Q output of flip-flop 26. Thus the switch pairs J-K and L-M are alternated by flip-flop 26.

CMOS switch 17 includes terminals 1-14 as indicated thereon. A positive voltage source is coupled to terminal 14 and, through resistors 85 and 86 to parallelled terminals 12 and 13, and 5 and 6, respectively. The Q terminal of flip-flop 26 is connected to the cathode of a diode 87, the anode of which is connected to terminals 12 and 13 of CMOS switch 17 and the $\overline{Q}$ terminal of flip-flop 26 is connected to the cathode of a diode 88, the anode of which is connected to terminals 5 and 6 of CMOS switch 17. The switch pairs J-K and L-M are operated at a vertical rate to selectively couple first and second, different, pincushion correction signals for application to a deflection yoke. The CMOS switch 17 is also operated at a horizontal rate, as will be shown, to provide a "shelf" during the horizontal retrace portion of the pincushion correction signal for insertion of a horizontal pulse for producing a trapezoidal raster correction. This pulse will be referred to as a trap pulse for simplicity. The first and second pincushion correction signals include second order components, which will be referred to as "W" and "M". The M and W designations refer to the general shape of the raster distortions at the top and the bottom of the raster, respectively. Flip-flop 26 provides a vertical rate switching signal that has a switching transition at the center of the CRT raster, i.e., at the zero crossing of the vertical ramp signal. The trap pulse is a horizontal rate parallellogram pulse that is used for generating a parallellogram shaped raster correction. As will be discussed in more detail below, the parallellogram pulse bypasses switch 17 and affects both the top and bottom portions of the raster. The parallellogram pulse will be referred to as a parallel pulse for simplicity.

Horizontal deflection signal source 30 supplies horizontal rate pulses to the S (set) input terminal of another flip-flop 28, which is operated as a one-shot multivibrator by virtue of a resistance-capacitance timing network coupled between its Q output and its CL (clock) and D inputs. A vertical retrace signal from vertical source 10 is applied through a resistor 109 and a capacitor 111 to the junction of a grounded resistor 112 and the anode of a diode 113. The cathode of diode 113 is connected to the R terminal of flip-flop 28 and to ground through a resistor 114. The circuit arrangement operates to differentiate the vertical retrace pulse. The multivibrator output pulses are coincident with the leading edges of the horizontal rate pulses, but are of shorter duration, which prevents distortion at the left edge of the raster. The Q output of flip-flop 28 supplies the CL input of flip-flop 26 to permit changes in the state of flip-flop 26 only during occurrence of horizontal retrace. Since flip-flop 26 has its D input supplied with vertical rate square wave pulses, it switches at the zero crossing of the vertical deflection signal (corresponding to the center of the CRT raster), but only during horizontal retrace. Therefore, the switching of the first and second pincushion correction signals is not visible on the CRT display since flip-flop 26 only switches during the retrace portion of the horizontal deflection signal.

The Q output of flip-flop 28 is connected through a series-connected capacitor 91 and a resistor 93 to the upper terminal of a trap potentiometer 95 and the upper terminal of a parallel potentiometer 96. Its $\overline{Q}$ output is connected through a series connection of a capacitor 92 and a resistor 94 to the lower terminals of these potentiometers. Trap potentiometer 95 comprises the trap pulse source. The horizontal rate trap pulse has an adjustable amplitude and polarity or phase and is supplied through a series connection of a resistor 97 and a capacitor 98 to pin 8 (−Y input) of a multiplier 66. Parallel potentiometer 96 comprises the parallel pulse source. The horizontal rate parallel pulse bypasses multiplier 66 and, consequently, is not combined with the first and second pincushion correction signals which, as will be seen, are applied to the input of multiplier 66.

Trapezoidal distortion of a raster along the north-south axis consists in the left side and the right side of the raster having unequal heights. Trapezoidal distortion is due primarily to the yoke being mispositioned on the neck of the CRT, specifically, the axis of the yoke is not coincident with the axis of the CRT. The trap pulse differentially adjusts the heights of the left and right sides of the raster, e.g., increases in the height of one side are accompanied by corresponding decreases in the height of the other side. The parallel pulse, on the other hand, does not change the relative heights of the raster sides, it merely displaces them with respect to the horizontal center line of the raster. As those skilled in the art will appreciate, the combination of a trapezoidal and a parallellogram raster correction can compensate for raster distortion due to mispositioning of the yoke on the CRT neck. The trap pulse is applied with a magnitude and polarity that varies with the vertical deflection position of the electron beam in the raster, whereas the parallel pulse is applied with a uniform magnitude and polarity throughout the vertical scan. This is accomplished by supplying the trap pulse to multiplier 66, which provides a varying amplitude and a polarity change with the vertical scan signal. The parallel pulse, however, bypasses multiplier 66 and does not experience a magnitude or polarity change during vertical scan.

A horizontal rate pulse from the Q output of flip-flip 28 is also supplied to a differentiation circuit, comprising a capacitor 21 and a resistor 23, and to the base of an NPN transistor 29 having a grounded emitter (FIG. 1B). A diode 25, connected in parallel with a resistor 27, connects the base of transistor 29 to ground. The collector of transistor 29 is connected through a resistor 32 to the collector of a PNP transistor 35 having an emitter that is connected to +V through resistor 36. A zener diode 33 and a series resistor 34 are connected across +V and ground, with the base of transistor 35 being connected to the junction of the diode 33 and resistor 34. The arrangement of transistor 35, resistor 36, and zener diode 33 establishes a current source to charge capacitor 31. A discharge switch is formed by transistor 29 and a horizontal rate voltage ramp is developed across capacitor 31, which is connected to the collectors of transistors 29 and 35. The horizontal rate voltages produce first order (parabolic yoke current) correction effects in the pincushion correction signals. Another current source/sync arrangement is formed by a PNP transistor 39 and an NPN transistor 41. Transistor 39 has its emitter and its base connected through a resistor 38 and a resistor 37, respectively, to +V. The collector of transistor 39 is connected to the collector of transistor 41 and the emitter of transistor 41 is connected through a pair of series-connected resistors 42 and 44 to −V. A capacitor 43 bypasses the junction of resistors 42 and 44 to ground. An integrating capacitor 40 is connected to the collectors of transistors 39 and 41, and develops a horizontal rate (first order) parabolic voltage thereacross. An NPN buffer transistor 46 has its base connected to the emitter of transistor 41, its collector connected, through a resistor 47, to +V and its emitter connected through a resistor 45 to the junction of resistors 42 and 44. The emitter of transistor 46 supplies a signal for controlling the level of the first and second pincushion correction signals that will be applied to the upper and lower portions of the raster.

The parabolic voltage across capacitor 40 is supplied to the base of an NPN transistor 50 that has a tuned circuit, comprising a coil 52 and a capacitor 57 that resonate at approximately twice the horizontal deflection frequency (2H), connected from its collector to +V through a resistor 54. A capacitor 53, in conjunction with resistor 54, provides a bypass and filter function. The emitter of transistor 50 is connected, through a resistor 51, to the junction of resistors 44 and 45. A voltage divider, established between +V and −V, includes resistors 37, 49, 51 and 44. The emitter of transistor 50 is connected back to the base of transistor 39 by resistor 49 to keep the current in transistor 50 stabilized. A capacitor 48 is coupled from +V to the base of transistor 39 for filtering out any parabolic signal in the feedback loop. The emitter of transistor 50 thus supplies a first order parabolic signal through a capacitor 63 and resistors 71 and 75 to the movable sliders on a pair of phase potentiometers 77 and 84, respectively. The lower end of phase potentiometer 77 is connected through a resistor 83 to the slider of a level potentiometer 69 and the lower end of phase potentiometer 84 is connected through a resistor 79 to the slider of a level potentiometer 67. The collector of transistor 50 is connected to the base of an NPN buffer transistor 55 that has its collector connected to +V through a resistor 56 and its emitter connected to ground through a resistor 58. The base of transistor 55 is connected to the collector of transistor 50. The second order 2H signal is developed across capacitor 57.

As mentioned previously, the general shape of the second order raster correction produced at the top and bottom portions of the raster, led to the designation of the correction signals as W and M, respectively. It will be noted that a single polarity W/M signal is developed but that a phase reversal occurs during its application, which corrects for the M and W raster distortion that occurs at the top and bottom of the raster. The second order correction W/M signal is supplied through a capacitor 59 to a pair of potentiometers 60 and 62 with potentiometer 60 being labelled W and potentiometer 62 being labelled M. The slider of potentiometer 60 is connected through a resistor 61 to the upper terminal of phase potentiometer 77 and the slider of M potentiometer 62 is connected through a resistor 81 to the upper terminal of phase potentiometer 84. Phase potentiometer 77 is connected across terminals 1 and 11 of CMOS switch 17 and phase potentiometer 84 is connected across terminals 4 and 8. CMOS switch terminals 1 and 2 correspond to switch J, terminals 11 and 10 to switch K, terminals 4 and 3 to switch L and terminals 8 and 9 to switch M. Output terminals 2 and 3, and output terminals 9 and 10 are connected together, respectively. The switch pairs are operated alternately with only one of switch pairs J-K and L-M being closed at any time. As shown, switches J-K are closed. The upper terminal of phase potentiometer 77 is thus connected to output terminal 2 and the lower terminal thereof is connected to output terminal 10. In the alternate position of switch 17, J-K will be open and L-M will be closed with potentiometer 84 being connected across output terminals 3 and 9. Since terminal 2 is connected to terminal 3 and terminal 9 is connected to terminal 10, closure of switches J-K couples phase potentiometer 77 to multiplier 66 and closure of switches L-M couples phase potentiometer 84 to multiplier 66. Thus terminals 2 and 3 of CMOS switch 17 are connected through a capacitor 98 to pin 8 which is the −Y input of multiplier 66. Simultaneously, terminals 9 and 10 of CMOS switch 17 are connected through a capacitor 99 to pin 4, which is the +Y input of multiplier 66. The +Y and −Y inputs are differential as is well-known in the multiplier art.

Looking at the "top" circuitry, a T/B level signal (a horizontal rate ramp from potentiometer 69), a T/B W/M signal (a twice horizontal rate sinewave from potentiometer 60) and a T/B phase signal (a horizontal rate parabola from potentiometer 77) that is differentially applied, are all coupled to the J-K switches of CMOS switch 17. Movement of the potentiometer settings changes the magnitudes of the T/B level and W/M signals and the differential phase and amplitude of the T/B phase signal. The waveforms at the outputs of CMOS switch 17 illustrate one setting of the various potentiometers. The first and second pincushion correction signals each include first order (horizontal rate) level and phase portions and second order W/M portions. In this context, the first pincushion correction signal affects the upper portion of the raster and the second pincushion correction signal affects the lower portion of the raster and the signals are independently applied by CMOS switch 17. These independent signals are present at potentiometers 60 and 62 for W/M, potentiometers 69 and 67 for the horizontal ramp level signals and potentiometers 77 and 84 for horizontal rate phase. The result is that correction signals consisting of a horizontal rate ramp, modified by a horizontal parabola and a 2H W/M signal appear at output terminals 2 and 3 and 9 and 10 at a vertical rate, due to switching of switch 17 by the Q and $\overline{Q}$ signals from flip-flop 26.

A fixed level, or shelf, is provided, as indicated by the letter S in the waveforms adjacent to output terminals 2 and 9 of CMOS switch 17, coincident with each horizontal retrace pulse. This is accomplished by opening CMOS switch 17 and forcing both J-K and L-M to be open at the same time. Switch 17 is opened by virtue of the connection of its terminals 5 and 6, and 12 and 13 to the $\overline{Q}$ output of flip-flop 28 through diodes 90 and 89, respectively. During the occurrence of the horizontal rate pulses from flip-flop 28 (which coincide with the retrace portions of the 1H sawtooth signal developed at the emitter of transistor 46, CMOS switch 17 is completely opened for a short period. The shelf provides a consistent signal output from the CMOS switch during retrace which signal output otherwise may not be as predictable as is desired. Insertion of the horizontal rate trap pulse on the fixed amplitude shelf yields more consistent results than adding the trap pulse to the often ambiguous retrace portion of the horizontal ramp signal.

Pin 8 of multiplier 66, as mentioned, is supplied with a horizontal rate trap pulse through resistor 97 and capacitor 98. Simultaneously, the signal from terminals 2 and 3 of CMOS switch 17 is applied and the timing is such that the horizontal trap pulse is applied at the time of occurrence of the shelf in the horizontal ramp waveform of the first and second pincushion correction signals. The position of the slider on trap potentiometer 95 determines the magnitude and the polarity of the applied trap pulse. The trap pulse can, of course, be of either polarity. The trap pulse and the first and second pincushion correction signals are simultaneously applied to multiplier 66 through pins 8 and 4 where they are multiplied with the vertical ramp signal applied to terminal 9 (+X) of the multiplier from a terminal 64. The −X terminal of multiplier 66 is connected to a bias source and is not shown.

The multiplier 66 has a differentially connected output that is coupled from +V through a resistor 102 and a pair of resistors 100 and 101. The multiplier is returned to −V through a resistor 110. The output from resistor 100 is supplied through a capacitor 103 and a resistor 105 to the negative (−) input of a differential amplifier 68 and the output from resistor 101 is supplied through a capacitor 104 and resistor 106 to the positive (+) input of amplifier 68. The slider of parallel potentiometer 96 is connected through a resistor 107 to the (−) input of differential amplifier 68. Feedback from the output of amplifier 68 to its (−) input is supplied through a parallel connection of a resistor 108 and a capacitor 109. The output of differential amplifier 68 is supplied through a capacitor 73 to the primary winding 74 of a transformer 72. The other end of winding 74 is connected to ground through a resistor 76. A secondary winding 78 of transformer 72 is connected in series with the vertical winding (not shown) of a yoke 80 which also includes a horizontal winding and is supplied with appropriate deflection signals from vertical deflection circuit 10 and horizontal deflection circuit 30 and is positioned on the neck of a CRT 82.

Operation of multiplier 66 in developing the well-known, generally bow tie-shaped pincushion correction signal is conventional. In this instance, however, the bow tie-shaped correction signal is modified by the trap and parallel pulses. The vertical rate ramp applied to the modular +X input (pin 9) of multiplier 66, which may be a type designated MC1495, goes through a zero transition at the center of the CRT raster. The differential carrier inputs (pins 4 and 8) of multiplier 66 are supplied with the first or the second pincushion correction signal, that is, the W/M signal and a horizontal rate ramp, and a horizontal rate trap pulse. The signals on the X and Y inputs are multiplied to develop a generally bow tie-shaped top/bottom raster distortion correction signal. Since flip-flop 26 alternately couples the independent first and second pincushion correction signals (first order horizontal ramp and parabola, modified with second order W/M corrections), via CMOS switch 17, to the carrier inputs of multiplier 66, independent top/bottom raster correction is obtained for these correction signals.

With the above-described arrangement, separately controllable first and second pincushion correction signals are applied to multiplier 66 along with a common horizontal trap pulse for multiplication with a vertical ramp. The final raster correction signal applied to transformer 74 also includes a constant magnitude horizontal rate parallel pulse. Because the controls are minimally interactive, fast accurate correction of top and bottom raster distortion on substantially flat-faced CRTs with mispositioned yokes is possible.

As mentioned, the trap pulse is not supplied through CMOS switch 17 and does not differentially affect the top and bottom portions of the raster. Rather, the trap pulse, with an amplitude and phase that are determined by rap potentiometer 95, is applied to the carrier inputs of multiplier 66 where its effect is modulated by the vertical ramp in accordance with the magnitude of the beam deflection angle, to afford the same degree of correction to both the top and the bottom portions of the raster.

The parallel pulse, on the other hand, bypasses multiplier 66 and is applied directly to the input of amplifier 68. Its amplitude and polarity, which are determined by the setting of parallel potentiometer 96, are fixed for each horizontal line of the developed raster and the parallel pulse affects all lines in both the top and bottom portions of the raster equally. It has been found that under raster distortion conditions that require significantly different top and bottom correction signals, a constant amplitude and polarity parallel pulse and a vertical scan-related trap pulse produces superior raster correction without switching distortions that might occur in a completely independent top/bottom correction system.

The provision of W/M second order signals results in a correction that more nearly matches the distortion of the raster that occurs in a substantially flat-faced CRT. Thus the addition of the 2H signals is believed to significantly benefit manufacturers of CRT monitors incorporating these type CRTs. Finally, providing a clean switching transition at the end of each scan (during horizontal retrace) for the addition of a trap pulse results in greater consistency of operation of the raster correction circuitry and is considered to be a significant advance over the art.

It is recognized that numerous changes in the described embodiment of the invention will be apparent to those skilled in the art without departing from its true spirit and scope. The invention is to be limited only as defined in the claims.

What is claimed is:

1. A raster correction system for a substantially flat-faced CRT including horizontal and vertical deflection means for developing thereon a raster defined generally by a top, a bottom and left and right sides, comprising:
   means for developing a first order correction signal;
   means for developing a second order correction signal;
   means for developing a trapezoidal correction signal for differentially affecting the heights of said left and said right sides of said raster;
   means for developing a parallelogram correction signal for vertically displacing said sides of said raster with respect to each other;
   means for applying said first order, said second order and said trapezoidal correction signals to said vertical deflection means for producing variable amplitude correction effects at said top and said bottom of said raster;
   means for applying said parallelogram correction signal to said vertical deflection means for developing constant amplitude correction effects at said top and at said bottom of said raster; and a multiplier having an input supplied with a vertical deflection rate signal from said vertical deflection means and having an output coupled to said vertical deflection means;

said first order, said second order and said trapezoidal correction signals being coupled to the input of said multiplier for multiplication with said vertical deflection rate signal, and said parallelogram correction signal being coupled to said vertical deflection means without multiplication with said vertical deflection rate signal.

2. The system of claim 1 wherein said trapezoidal and said first order correction signals are developed from a horizontal deflection rate signal from said horizontal deflection means, and further including potentiometer means for changing the amplitudes of said trapezoidal and said first order correction signals.

3. A raster correction system for a substantially flat-faced CRT including horizontal and vertical deflection means for developing thereon a raster defined generally by a top, a bottom and left and right sides comprising:

means for developing a pincushion correction signal including first order correction components and second order correction components;

means for independently adjusting the amplitudes of said first and said second order correction components;

means for developing a trapezoidal correction signal for differentially affecting the heights of said left and said right sides of said raster;

means for developing a parallelogram correction signal for vertically displacing said sides of said raster with respect to each other;

means for adjusting the phase of said pincushion correction signal;

means for applying said pincushion correction signal and said trapezoidal correction signal to said vertical deflection means for producing correction effects of maximum amplitude at said top and at said bottom of said raster and of zero amplitude at the center of said raster; and means for applying said parallelogram correction signal to said vertical deflection means for developing a fixed amplitude correction effect throughout said raster.

4. The system of claim 3 wherein said first order correction effects are at the horizontal deflection frequency rate and said second order correction effects are at twice the horizontal deflection frequency rate.

5. The system of claim 4, further including a multiplier having a pair of inputs and an output coupled to said vertical deflection means;

means providing a vertical deflection rate signal to one of said inputs;

means for coupling said pincushion correction signal and said trapezoidal correction signal to said other input; and means for applying said parallelogram correction signal to said vertical deflection means.

6. A CRT raster deflection system including a CRT and horizontal and vertical deflection means comprising:

first and second pincushion correction signals having independently controllable characteristics;

third and fourth raster correction signals having commonly controllable characteristics;

means for applying said first and said second pincushion correction signals to said vertical deflection means during scanning of the top and the bottom of said raster, respectively;

means for applying said third and said fourth raster correction signals to said vertical deflection means during scanning of both the top and the bottom of said raster; and means for modulating signals at a vertical rate coupled to said vertical deflection means, said first and said second pincushion correction signals and said third raster correction signal being applied to said modulating means and said fourth raster correction signal being applied to said vertical deflection means.

7. The system of claim 6 wherein said modulating means is a multiplier and said first and said second pincushion correction signals include first order and second order correction components, said third raster correction signal is a trapezoidal correction signal and said fourth correction signal is a parallellogram correction signal.

8. The system of claim 7, further including switching means operated by said vertical deflection means for alternately coupling said first and said second pincushion correction signals to said multiplier.

9. A CRT raster deflection system including a CRT and horizontal and vertical deflection means comprising:

a first and a second pincushion correction signal having independently controlled characteristics;

trapezoidal and parallellogram raster correction signals having commonly controllable characteristics;

multiplier means having a pair of inputs and an output coupled to said vertical deflection means;

means for selectively applying said first and said second pincushion correction signals including first order and second order correction components to one of said inputs of said multiplying means;

means for supplying a vertical rate signal to the other input of said multiplying means; and means for applying said trapezoidal and parallellogram raster correction signals to said vertical deflection means.

10. In a CRT raster deflection system including horizontal and vertical deflection means;

a multiplier for developing a pincushion correction signal that varies at both a horizontal and a vertical rate;

switching means for applying said pincushion correction signal to said vertical deflection means during scanning of the top and bottom portions of the raster, respectively;

means for developing a horizontal trapezoidal correction pulse for application to said multiplier;

means for developing a horizontal rate ramp signal having a rising portion and a falling portion;

means for establishing a fixed level for said ramp signal during said falling portion; and means for supplying said horizontal trapezoidal pulse to the output of said switching means.

11. The system of claim 10 wherein said level establishing means includes means for disabling said switching means during said falling portion of said horizontal rate ramp signal.

12. The system of claim 11, further including diode means including switching diodes supplied with vertical rate signals from said vertical deflection means and switching diodes supplied with horizontal rate signals from said horizontal deflection means.

13. The system of claim 12 wherein said switching means is a CMOS switch that alternately opens and closes a pair of switch circuits; said pair of switch circuits both being opened when said CMOS switch is disabled.

* * * * *